(No Model.) 2 Sheets—Sheet 1.

T. HARRIS.
WIRE TACK MACHINE.

No. 306,609. Patented Oct. 14, 1884.

Witnesses:
J. H. Shumway
Jos. A. Earle

Thomas Harris
Inventor
By Atty,
John A. Earle (No Model.) 2 Sheets—Sheet 2.
T. HARRIS.
WIRE TACK MACHINE.
No. 306,609. Patented Oct. 14, 1884.
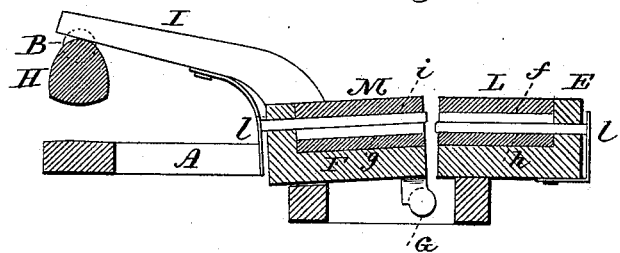
Fig. 4
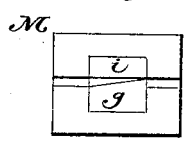
Fig. 6
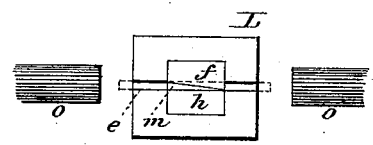
Fig. 5
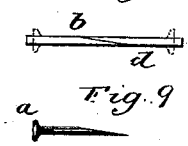
Fig. 10
Fig. 9
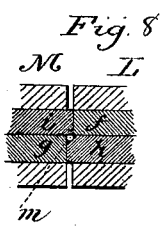
Fig. 8
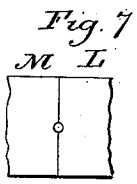
Fig. 7
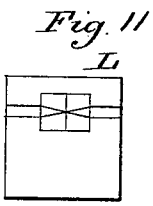
Fig. 11
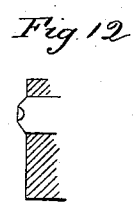
Fig. 12
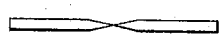
Fig. 13
Witnesses
J. R. Shumway
Jas. A. Earle
Thomas Harris Inventor
By Atty.
John P. Earle

UNITED STATES PATENT OFFICE.

THOMAS HARRIS, OF SEYMOUR, CONNECTICUT, ASSIGNOR OF ONE-HALF TO CARLOS FRENCH, OF SAME PLACE.

WIRE-TACK MACHINE.

SPECIFICATION forming part of Letters Patent No. 306,609, dated October 14, 1884.

Application filed March 13, 1884. (No model.)

*To all whom it may concern:*

Be it known that I, THOMAS HARRIS, of Seymour, in the county of New Haven and State of Connecticut, have invented a new Improvement in Machines for Making Wire Tacks; and I do hereby declare the following, when taken in connection with accompanying drawings and the letters of reference marked thereon, to be a full, clear, and exact description of the same, and which said drawings constitute part of this specification, and represent, in—

Figure 1:
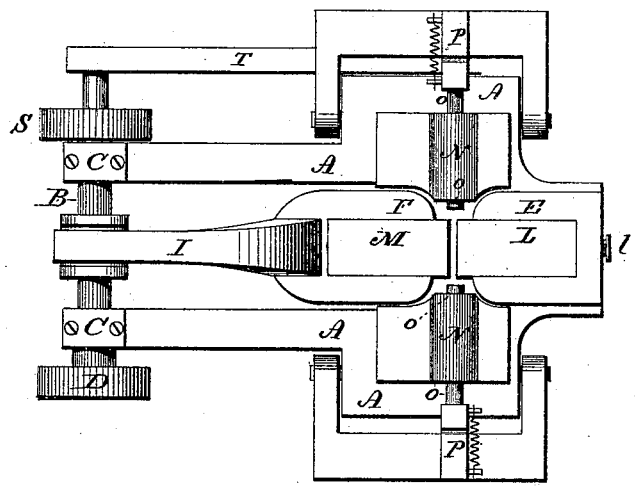
Figure 2:
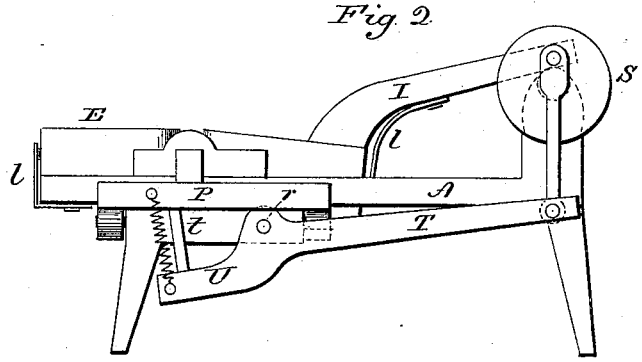
Figure 3:
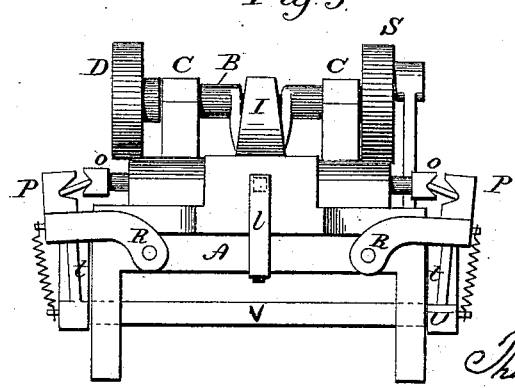

Figure 1, a top view of the machine; Fig. 2, an end view; Fig. 3, a front view; Fig. 4, a central section; Figs. 5 and 6, end views, respectively, of the dies; Fig. 7, the two dies L M as closed upon the blank; Fig. 8, a longitudinal section through the dies, showing the holders as in their position of first taking the blank; Fig. 9, the tack complete; Fig. 10, the blank, showing the cut; Figs. 11, 12, and 13, modifications.

This invention relates to an improvement in machines for the manufacture of headed tacks, the object of the invention being to produce such tacks from wire, and so economically as to successfully compete with the common cut tacks.

The tack to be produced is seen in Fig. 9. It is made from wire of the requisite diameter for the body of the tack, one end upset to form the head *a*, the other pointed by a long diagonal cut extending from about midway of the length of the tack on one side to the extreme point at the opposite side, leaving the said opposite side substantially straight. This tack is produced by a blank cut from wire of length for two tacks, as seen in Fig. 10, the two ends upset, as indicated in broken lines, to form the head upon both ends, and then a diagonal cut made from a point, *b*, at one side across to a point, *d*, on the opposite side, which separates the blank into two parts, and forms two complete tacks from that blank, both pointed by the single cut.

I will now proceed to describe the machine by which this peculiar tack is produced.

A is the bed of the machine, supported on suitable legs; B, the driving-shaft, arranged in bearings C C, and to which power is applied through a pulley, D, or otherwise to impart revolution to said shaft.

E is a fixed die-holder at the front of the machine; F, a movable die-holder arranged in rear of the die-holder E, and hung upon a hinge, G, below, and so as to move toward and from the die-holder E, turning on the hinge G. Such vibratory or swinging movement is imparted to the die-holder by a cam, H, on the driving-shaft B, working beneath an arm, I, which extends from the die-holder F, as seen in Fig. 4. These die-holders each carry a die, respectively, L M. An end view of the die L is shown enlarged in Fig. 5. The width of this die is equal to the length of the blank between the two heads. Across the face of these dies L M is a horizontal groove or cavity, *e*, the two grooves together corresponding to the size and shape of the wire blank, and so that when the two are brought together, as seen in Fig. 7, they firmly grasp the wire. These dies project beyond the forward end of the die-holders, as seen in Fig. 1.

In the dies L M the cutting-dies to form the point are arranged and fixed. These dies consist of two parts, the one, *f*, arranged in the die L, the other, *g*, arranged in the die M. Their faces or ends stand flush with the faces or ends of the dies L M. The meeting-edge of each is inclined, as seen in Figs. 5 and 6, and extends from the upper side of the cavity *e* diagonally across to the opposite side, the edges of the two dies standing in the same plane, and so as to come exactly together when the dies L M are forced together, and so that a blank—such as seen in Fig. 10—resting between the two dies L M, will, when the two dies L M come together, be inclosed by the cavities *e*. As the dies L M approach each other to thus close upon the blank, the cutters at the same time come together, and the blank will be cut, as from *b* to *d*, Fig. 10, thus separating the blank into two parts, both of which are pointed. The clamping of the blank and the diagonal cut to form the points are simultaneous operations.

To catch and hold the blank in its proper relation to the cavities *e*, as well as to hold the blank against the cutters and prevent deflection of the metal, a die-like holder, h, is introduced into the die L parallel with the cutter f, and a like holder, i, is introduced into the die M parallel with the cutter g, and as seen in Figs. 4 and 8, and also seen in Figs. 5 and 6. The surface of these holders adjacent to the cutters is inclined corresponding to the inclined surface of the respective cutters, and the said holders are permitted a certain amount of movement longitudinally, they extending through the dies L M, and at the extreme end each is provided with a spring, l, which bears upon the rear end, the tendency of the spring being to force those holders toward each other, and hold them projecting beyond the end of the cutters and of the dies L M, as seen in Figs. 4 and 8. The face of each of these holders has a groove, m, cut therein, forming, practically, a continuation of the groove or cavity e in the dies L M. The blank is introduced between the dies, and as the dies approach each other the holders h i come together, as seen in Fig. 8, and hold the blank in the groove between them, the groove in the two parts being sufficient to retain the blank in line with the cavities e. Then the continued movement of the die-holders brings the dies L M together, as seen in Fig. 7, the springs l yielding as the dies come together, so that the holders h i will be forced inward by the respective cutters which come against the end of said holders. This movement, as before described, makes the diagonal cut across the blank, and in such cut the holders support the metal from the side opposite the respective cutters, and resist the tendency of such cut to deflect or turn the metal out of line. The dies L M, coming together, firmly grasp the blank, leaving the ends projecting, as indicated in broken lines, Fig. 5, sufficient to form the head. While the blank is thus held, the heading-hammers are brought against the end of the blank, so as to upset it against the corresponding ends of the dies L M, they serving as anvils for that purpose. These heading dies or hammers are best made as seen in the drawings.

o o are the hammers, one at each side of the dies L M and on a line with the cavity e. They are arranged, respectively, in suitable guides, N, and so as to be moved toward and from the respective sides of the dies L M, their faces shaped corresponding to the exterior of the head of the tack to be formed. These slides or hammers are operated by a rocking yoke, P— one at each side—bearing against the outer ends of the hammers o. These yokes are hung to the frame, as at R. The rocking movement is imparted to these yokes by a crank-wheel, S, on the driving-shaft, in connection with one arm, T, of a lever hung to the frame of the machine, as at r, the other arm, U, operating upon the yokes through a strut, t, as seen in Fig. 2. This lever T U is arranged at one side of the machine, as seen in Fig. 1, but is formed with a second arm, V, extending across to the opposite side of the machine, and so as to operate through a strut, t, upon the yoke at that side, as seen in Fig. 3, and so that a like and simultaneous vibratory movement is imparted to both hammers.

After the heading operation the dies separate, and the tacks fall from the machine complete, and ready for market or use.

The wire may be fed to the machine in blanks previously cut, or it may be fed to the machine and cut off therein. Mechanism for such introduction of the wire being well known, it is not necessary to complicate the drawings or the specification with an illustration and description thereof, it being sufficient for the illustration of the invention to suppose that the blanks are introduced by hand.

To make what are commonly called "French nails" or tacks—that is to say, a headed round wire tack having a conical-shaped point—dies such as seen in Fig. 11 may be employed in place of the cutters and holders f g h i. These cutters or dies have in each a half conical cavity, the two apexes of the two cavities meeting at the center, the edges of these cavities having cutters, as seen in Fig. 12, and so that as the dies L M come together the point will be cut and swaged into conical shape, and cut away the surplus metal, as seen in Fig. 13, the cut separating the blank at the apex of the points.

I claim—

1. In a machine for making tacks from wire, the combination of the dies L M, one stationary, the other arranged for oscillatory movement toward and from the first, the adjacent faces of the two constructed with a cavity, e, the two cavities corresponding to the wire blank from which the tack is to be produced, a cutter in each of said dies arranged to sever the blank midway of its length into two parts, and thereby form the points, two hammers arranged in line with the cavities in the dies L M, each of said hammers arranged to move toward and from respective sides of said dies L M, and the mechanism, substantially such as described, to impart reciprocating movement to said movable dies and hammers, substantially as described.

2. The combination of the two dies L M, each having a corresponding cavity, e, across its face, the cutters f g, one arranged in each of said dies, the cutting-edge of each cutter being diagonally across the cavity e, and corresponding to each other, the mechanism, substantially such as described, to close said dies L M, and hammers one upon each side of said dies L M, and in line with the cavity e, and the mechanism, substantially such as described, to impart reciprocating movement to said hammers, substantially as specified.

3. The combination of the dies L M, the face of each constructed with a corresponding cavity, e, the cutters f g—one in each of said dies—the cutting-edge of said cutters being diagonally across the said cavity, the holders h i—one in each of said dies, and movable therein to grasp the blank—two hammers arranged one each side of said dies L M, and in line with the cavity therein, and the mechanism, substantially such as described, to close said dies and impart reciprocating movement to said hammers, substantially as specified.

THOMAS HARRIS.

Witnesses:
JOHN E. EARLE,
JOS. C. EARLE.